Jan. 5, 1926.  
E. A. ROBE  
1,568,948  
SHIPPING OR STORAGE RECEPTACLE OF THE VACUUM TYPE  
Filed March 22, 1924
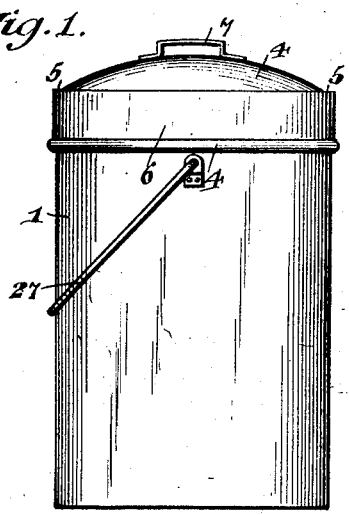
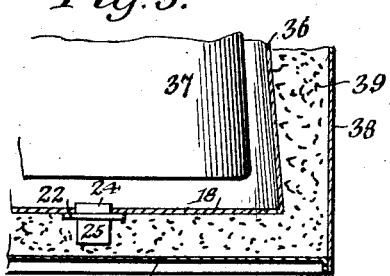
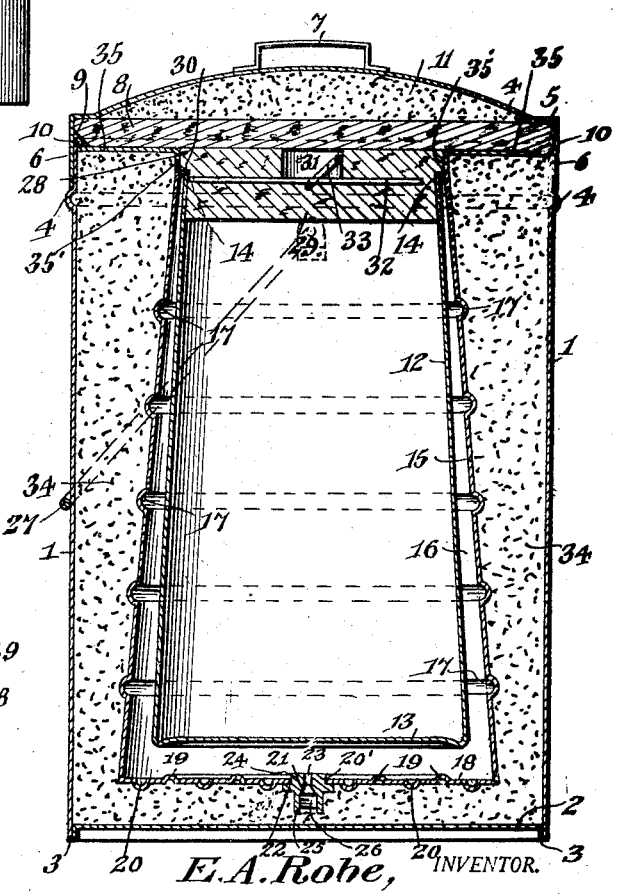
E. A. Robe, INVENTOR.
BY
Geo. F. Kimmel, ATTORNEY.

Patented Jan. 5, 1926.

1,568,948

UNITED STATES PATENT OFFICE.

EUGENE A. ROBE, OF LEAVITTSBURG, OHIO.

SHIPPING OR STORAGE RECEPTACLE OF THE VACUUM TYPE.

Application filed March 22, 1924. Serial No. 701,076.

*To all whom it may concern:*

Be it known that I, EUGENE A. ROBE, a citizen of the United States, residing at Leavittsburg, in the county of Trumbull and State of Ohio, have invented certain new and useful Improvements in Shipping or Storage Receptacles of the Vacuum Type, of which the following is a specification.

This invention relates to a shipping or storage receptacle of the vacuum type, and has for its object to provide a receptacle of such class, in a manner as hereinafter set forth, whereby the contents thereof will be maintained at an even temperature, either hot or cold, throughout the desired period of shipment or storage.

A further object of the invention is to provide a receptacle of such class, in a manner as hereinafter set forth, with an inner container and means whereby a vacuum can be created to surround said inner container to maintain the contents thereof at an even temperature, and further to provide a receptacle with means, in a manner as hereinafter set forth, for the purpose of protecting said inner container as well as to withstand the ordinary hard usage to which the receptacle may be subjected without injury thereto.

Further objects of the invention are to provide, in a manner as hereinafter set forth, a receptacle of the class referred to, which is simple in its construction and arrangement, strong, durable, compact, thoroughly efficient in its use, readily assembled, and comparatively inexpensive to manufacture.

With the foregoing and other objects in view, the invention consists of the novel construction, combination and arrangement of parts, as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—

Figure 1 is a side elevation of a receptacle in accordance with this invention.

Figure 2 is a vertical sectional view thereof upon an enlarged scale.

Figure 3 is a top plan view of the inner container stopper or plug.

Figure 4 is an edge view of an element of the lid or cover.

Figure 5 is a fragmentary view, in vertical section, of a modified form.

A receptacle, in accordance with this invention, comprises a body portion, preferably cylindrical in contour, a removable lid or cover therefor, an inner container of tapering contour, an intermediate container of tapering contour surrounding and spaced from the inner container to provide a vacuum chamber, a stopper or plug for the inner container and which coacts to close the intermediate container, and a body of insulation interposed between the intermediate container and the body portion.

The body portion, indicated at 1, is constructed of any suitable metallic material and preferably is cylindrical in contour though if desired it can be of a different shape than as shown, and the bottom 2 of the body portion is formed of a flanged plate and with the flange of the plate indicated at 3 and flush with the bottom edge of the body portion 1. By this arrangement the bottom 2 is inset with respect to the lower end of the body portion 1, and the latter in proximity to its upper end is provided with a laterally extending stop bead 4, against which abuts the rim of the lid or cover, to be presently referred to.

The lid or cover is formed of a body portion comprising a dome-shaped top 4, terminating in a laterally extending annular flange 5 which merges into a depending annular rim 6 of substantial height. Secured to the top 4, centrally thereof, is a handle member 7.

Arranged within the rim 6 and abutting against the flange 5 is a cork disk 8 of less thickness than the height of the rim 6 and which snugly engages the inner face of the rim 6. The disk 8 has the lower portion of its edge inwardly bevelled, as at 9, whereby the bevelled portion of said edge will project inwardly from the inner face of the rim 6. Arranged within the rim 6 is a retaining element for the disk 8 and which consists of an annular wire 10, soldered in position and which is interposed between the bevelled portion of the edge 9 and the inner face of the rim 6. The wire 10 is soldered to the rim 6. That portion of the rim 6 which depends from the wire 10 is adapted to surround the upper portion of the body portion 1, as well as frictionally engages therewith, whereby the lid or cover is connected to said body portion 1. The bead 4, as before stated, arrests the onward movement of the rim 6.

Interposed between the disk 8 and the dome-shaped top 4, is a body of insulation 11 and which can be of granulated cork packing if desired.

The inner container is of materially less height than the body portion 1 and is set up from a single piece of any suitable metallic material of the desired thickness and which is indicated at 12. The inner container is of tapered contour, open at its top and is formed with an inset bottom 13. The upper end of the inner container 12 is formed with an outwardly extending annular flange 14, which constitutes a spacing medium between the inner and intermediate containers.

The intermediate container is constructed from a single piece of suitable metallic material of the desired thickness, is of tapered contour and of greater length and greater diameter throughout than the inner container 12. The intermediate container is spaced throughout from the body portion 1. The intermediate container is indicated at 15 and surrounds and is spaced from the inner container 12 to provide a vacuum chamber 16. The body portion of the intermediate container is provided with a plurality of spaced offset portions 17 to form reinforcing ribs. The bottom of the intermediate container is indicated at 18 and is provided with a plurality of inset and a plurality of outset circular portions 19, 20, respectively to form a series of circular reinforcing ribs. The body portion 18, centrally thereof, has an opening 20, through which extends a flanged nipple 21 and with the flange of the latter indicated at 22 and abutting against the outer face of the body portion 18. The nipple 21 is ported, as at 23, for a portion of its length and the lower end of the port 23 merges into the tapered upper end 24 of a cylindrical bore 25. The wall of the bore 25 is threaded. The nipple 21 provides a housing for a valve plug 26 which threadedly engages with the threaded wall of the bore 25. The port 23, when the plug 26 is removed, provides means for setting up a vacuum within the chamber 16 and after the vacuum is created the plug 26 is sealed in any suitable manner, within the nipple 21.

The containers have associated therewith a flanged closure element, to be hereinafter referred to, for closing the space or opening formed between the container 15 and the body portion 1. The flange 14 of the inner container 12 is secured to the container 15, so that the inner container will be suspended within the intermediate container 15.

The upper end of the inner container 12 is closed through the medium of a removable cork plug or stopper which also extends into the closure element referred to.

The plug or stopper consists of a cylindrical portion 28 and a tapered lower portion 29 and with the upper terminus of the latter of materially less diameter than the diameter of the portion 28, whereby the plug or stopper is formed with an annular shoulder 30, which seats on the flange 14 when the plug or stopper is mounted in closure position. The portion 28, centrally thereof, is formed with a pocket 31, and extending across the lower portion thereof is a holding wire 32, which is embedded within the plug or stopper and is disposed diametrically thereof. Mounted in the pocket 31 is a ring 33, which is coupled with the plug or stopper through the medium of the wire 32, and said ring provides means for conveniently removing the plug or stopper from closure position. The portion 28 is of such diameter with respect to the closure element as to snugly fit the inner face thereof, and the portion 29 is of such diameter with respect to the inner container 12 as to snugly fit the inner face thereof, whereby the inner container 12 is sealed at its top. The portion 28 is of a height, when the stopper of plug is mounted in closure position to have its upper face flush with the top edge of the closure element.

Interposed between the side and bottom of the body portion 1 and the side and bottom of the intermediate container 15, is a packing of insulation 34, such as ground cork or other suitable material which not only provides means for insulating the intermediate container 15, but also acts as a protecting medium therefor. The packing 34 completely fills the space formed between the intermediate container 15, the bottom 2 and the body portion 1.

The top of the space formed between the intermediate container and the body portion 1, is closed through the medium of a flanged closure element consisting of a flat metallic annulus 35, which is soldered to the inner face or the upper edge of the body portion 1. The annulus 35 has a depending flange 35', which is secured to the flange 30 or to one of the containers at the upper end thereof.

The body portion 1 is provided with a bail 27.

When the lid or cover is mounted in position, the cork disk 8 seats on the annulus 35, top edge of the intermediate container 15 and the upper face of the portion 28 of the stopper or plug employed for closing the said containers.

The modified form shown in Figure 5 is the same as that shown in Figure 2, with this exception, that the intermediate container 15 is not provided with the reinforcing ribs, but is smooth throughout. In Figure 5, the intermediate container is indicated at 36, the inner container at 37, body portion at 38 and packing at 39. Otherwise than that as stated, the construction shown in Figure 5 is the same as that shown in Figure 2.

The tapered construction of the inner and intermediate containers provides for a vacuum chamber which gradually increases in width from the upper end of the inner container. The setting up of the intermediate container of tapered form, with respect to the cylindrical body portion 1, provides for an additional thickness of packing 34, at the upper portion of the intermediate container.

The manner of setting up the valve plug in connection with the nipple 21 provides a convenient means for setting up a vacuum in the chamber 16.

It is thought that the many advantages of a receptacle of the class referred to in accordance with this invention can be readily understood, and although the preferred embodiment of the invention is as described and illustrated, yet it is to be understood that changes in the details of construction can be had which will fall within the scope of the invention as claimed.

What I claim is:—

1. A receptacle comprising a body portion, a tapering intermediate container arranged therein and spaced therefrom, a packing of insulation interposed between said container and said body portion, a tapering inner container connected with and suspended from the upper portion of said intermediate container, said inner container of less height and of less diameter than said intermediate container and providing therebetween a vacuum chamber, a flanged closure element extending inwardly from said body portion and seated on said intermediate container, a closure plug of two different diameters common to said element and said inner container, said plug provided in its top with a pocket and means arranged therein to facilitate the removal of the plug from closure position.

2. In a receptacle for the purpose set forth, an inner and an intermediate container offset to provide spaced circumferentially extending hollow semi-circular ribs, the former arranged within and spaced from the latter, said containers having closed bottoms and open tops, a shouldered plug common to and closing the tops of said containers, said plug provided in its top with a pocket, and means within the pocket and connected to the plug to facilitate the removal thereof from closure position.

3. In a receptacle for the purpose set forth a lid comprising a rim, a dome-shaped top formed with an annular flange terminating in the upper end of the rim, a cork disk arranged within the rim and seated against said flange, said disk having a portion of its edge bevelled, a retaining wire soldered to the rim and interposed therebetween and the bevelled portion of said edge, and a packing interposed between said disk and said top.

4. In a receptacle of the class referred to a closure consisting of a body portion formed of a depending rim and a dome-shaped top merging at its bottom in a laterally extending flat annular flange terminating in the top of said rim, a flat cork disk abutting against the lower face of the flange and the inner face of the rim at the upper portion thereof, said disk having an inwardly bevelled lower portion, means surrounding the lower portion of the disk and abutting against the inner face of the rim for securing the disk against said flange, and a packing filling the space between the upper face of the disk and inner face of the dome-shaped top.

5. A receptacle comprising a body portion, a tapered intermediate container arranged therein, spaced therefrom and of less height than said body portion, a packing of insulation interposed between said container and said body portion, a tapering inner container arranged in, spaced therefrom and of less height than said intermediate container thereby providing a vacuum chamber, said inner container having its top provided with a lateral flange connected to the top of the intermediate container, a closure plate connected to the top of the body portion and provided with a depending flange connected with the top of the intermediate container and spaced from the inner container, a closure plug arranged within the flange of the closure plate and further seating on the flange of the inner container and extending into the latter, and a cover seating on said closure plate and plug and provided with a rim surrounding the upper part of the body portion.

In testimony whereof, I affix my signature hereto.

EUGENE A. ROBE.